US006898625B2

(12) United States Patent
Henry et al.

(10) Patent No.: US 6,898,625 B2
(45) Date of Patent: May 24, 2005

(54) DOCUMENT TRACKING METHODS AND SYSTEM THEREFOR

(75) Inventors: Steven G. Henry, Fort Collins, CO (US); Steve Rossman, Greeley, CO (US); Jeffrey G. Wiley, Greeley, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 512 days.

(21) Appl. No.: 10/025,087

(22) Filed: Dec. 18, 2001

(65) Prior Publication Data

US 2003/0115544 A1 Jun. 19, 2003

(51) Int. Cl.[7] .............................................. G06F 13/00
(52) U.S. Cl. ........................ 709/206; 203/217; 203/219
(58) Field of Search .............................. 709/206, 200, 709/201, 203, 217, 218, 219, 220, 224

(56) References Cited

U.S. PATENT DOCUMENTS

| | | | | | |
|---|---|---|---|---|---|
| 5,293,250 | A | * | 3/1994 | Okumura et al. | 358/402 |
| 5,424,724 | A | * | 6/1995 | Williams et al. | 340/825.05 |
| 5,838,685 | A | * | 11/1998 | Hochman | 370/428 |
| 5,872,925 | A | * | 2/1999 | Han | 709/206 |
| 5,944,786 | A | * | 8/1999 | Quinn | 709/206 |
| 5,956,521 | A | * | 9/1999 | Wang | 395/855 |
| 6,076,101 | A | * | 6/2000 | Kamakura et al. | 709/206 |
| 6,175,859 | B1 | * | 1/2001 | Mohler | 709/206 |
| 6,266,703 | B1 | * | 7/2001 | Clark et al. | 709/237 |
| 6,327,656 | B2 | * | 12/2001 | Zabetian | 713/176 |
| 6,373,602 | B1 | * | 4/2002 | Kohler et al. | 358/538 |
| 6,388,761 | B1 | * | 5/2002 | Morisaki | 358/1.15 |
| 6,449,054 | B1 | * | 9/2002 | Cox et al. | 358/1.15 |
| 6,463,134 | B1 | * | 10/2002 | Okada et al. | 379/93.24 |
| 6,693,729 | B1 | * | 2/2004 | Bloomfield | 358/402 |
| 6,751,670 | B1 | * | 6/2004 | Patterson | 709/229 |
| 6,760,752 | B1 | * | 7/2004 | Liu et al. | 709/206 |
| 2002/0091780 | A1 | * | 7/2002 | Ohta et al. | 709/206 |
| 2002/0104026 | A1 | * | 8/2002 | Barra et al. | 713/202 |

OTHER PUBLICATIONS

J. Palme, Stockholm University/KTH, "Common Internet Message Headers," Feb. 1997, pp. 1–27.
R. Fajman, National Institutes of Health, "An Extensible Message Format for Message Disposition Notifications," Mar. 1998, pp. 1–28.
iTraceYou.com, OpenTrace Technologies, 9 pages, published to the Internet at least as early as Aug. 29, 2001.
Deborah Shadovitz, MacCentral Online, "Mac Efficiency 101: Return Receipt email," Feb. 7, 2001, pp. 1–9.

* cited by examiner

Primary Examiner—Moustafa M. Meky

(57) ABSTRACT

Document tracking methods and system therefor. Preferred embodiments may comprise sending a document from a multifunction device to a network destination, and sending a tracking component for the document from the multifunction device to a receipt service. The receipt service may generate a return receipt based at least in part on the tracking component when the document is at the network destination to acknowledge receipt of the document by the network destination.

26 Claims, 5 Drawing Sheets

DOCUMENT TRACKING METHODS AND SYSTEM THEREFOR

FIELD OF THE INVENTION

The invention generally pertains to document tracking, and more specifically, to document tracking methods and system therefor.

BACKGROUND OF THE INVENTION

Multifunction devices (MFDs) offer a convenient way of communicating with a variety of devices from an individual stand-alone device. Briefly, multifunction devices may be used to convert a paper document to an electronic image and then to transmit the electronic image to a variety of network destinations. For example, the multifunction device may be used to send the electronic image of the paper document to an email account, a printer, a copier, an Independent Software Vendor (ISV) application, a mobile phone, and an Internet site, to name but a few such network destinations.

As an illustration, the user may send a paper document to a recipient as follows. The user positions a paper document in the automatic document feeder (ADF) or directly on the imaging bed of the multifunction device. The user then activates the multifunction device, for example, by pressing a "start" button. In turn, the multifunction device converts the paper document to an electronic image thereof. The user may identify a recipient for the electronic image of the paper document. For example, the user may identify a recipient by keying in a fax number, an email account, etc., using the keypad of the multifunction device 100. Or for example, the user may identify a recipient by selecting the same from a menu or address book shown on the display at the multifunction device. The multifunction device then sends the electronic image of the paper document over a suitable network (e.g., the Internet, an Intranet) to the recipient at any of a number of various network destinations.

In various circumstances, the user may want an acknowledgment that the document was received, whether it is for record-keeping purposes, or for any number of other reasons. The user may request (e.g., explicitly in the message) that the recipient send a reply back to the user to acknowledge receipt of the document. However, the user must then wait for the recipient to send the reply acknowledging receipt of the document. Where the intended recipient never received the document, the user typically waits for a period of time before realizing that the document was not received, and upon such realization, the user may resend the document. However, this is time consuming and inconvenient for both the user and the recipient.

Alternatively, the user may call the recipient after sending the document to confirm that he or she received the document. However, this approach is not feasible when the recipient does not have access to a telephone. Even if the recipient does have access to a telephone, it is still time consuming and inconvenient for both the user and the recipient to call one or the other and confirm receipt of the document. Indeed, where the document is sent to multiple recipients, the user must call each of the recipients to ensure that they have all received the document.

If the sender is sending an email, various software approaches are available for requesting receipts. For example, extended simplified mail transport protocol (ESMTP) allows the sender to request a receipt from the recipient's email server. However, this approach is not supported by all email software, and hence the sender may not receive a receipt when the recipient's email software does not support this function.

A more universal approach for requesting receipts for email may employ a third-party Internet site, such as is currently provided at "www.itraceyou.com". Such third-party Internet sites may require that the sender modify the email address of the recipient so that the email is instead sent to the third-party Internet site and logged before being resent from the third-party Internet site to the recipient. When the recipient receives the email, the third-party Internet site is accessed and updated to acknowledge receipt of the email, which in turn emails the sender a receipt. This approach thus requires extra steps by the sender (e.g., modifying the email address), and may slow transmission of the email.

SUMMARY OF THE INVENTION

An embodiment of document tracking methods may comprise the steps of: sending a document from a multifunction device to a network destination, sending a tracking component for the document from the multifunction device to a receipt service, and generating a return receipt based at least in part on the tracking component at the receipt service to acknowledge receipt of the document by the network destination.

Other embodiments of document tracking methods may comprise the steps of: sending an electronic document from a multifunction device to a network destination, sending a confirmation of receipt to a receipt service when the electronic document is at said network destination, and generating a return receipt based at least in part on the confirmation of receipt at the receipt service to acknowledge receipt of the document by the network destination.

System for tracking a document is also disclosed and may comprise a multifunction device for sending the document to a network destination. In addition, a tracking component may be generated for the document and sent from the multifunction device. When the document is at the network destination, a confirmation of receipt may be sent from the network destination to a receipt service. The receipt service may receive the tracking component and the confirmation of receipt and generate a return receipt based at least in part on the tracking component and the confirmation of receipt to acknowledge receipt of the document by the network destination.

DESCRIPTION OF THE DRAWINGS

Illustrative and presently preferred embodiments of the invention are illustrated in the drawings, in which.

DESCRIPTION OF THE PREFERRED EMBODIMENT

Figure 1:
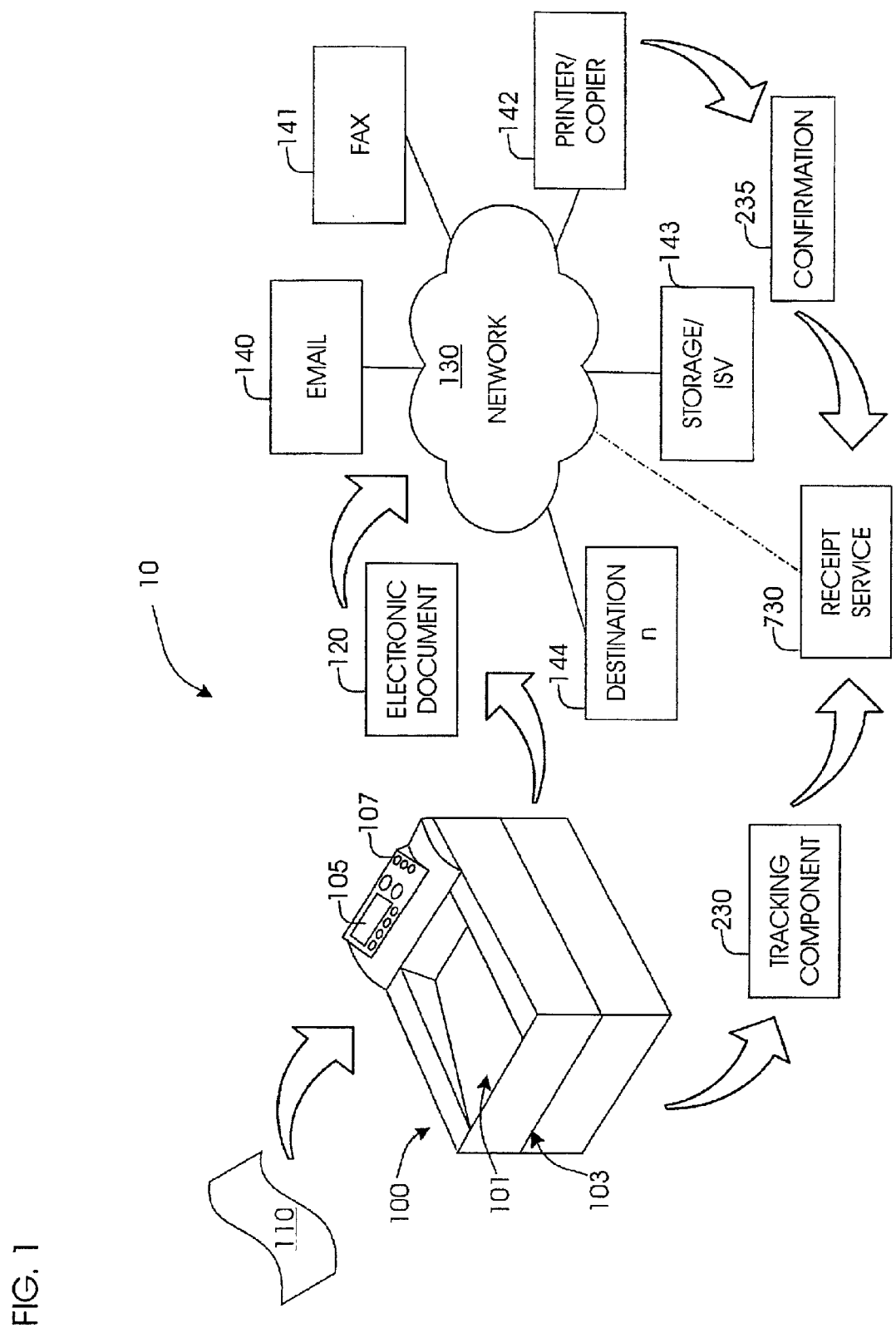
FIG. 1 is a high-level diagram illustrating an embodiment of a document tracking system.
Figure 5:
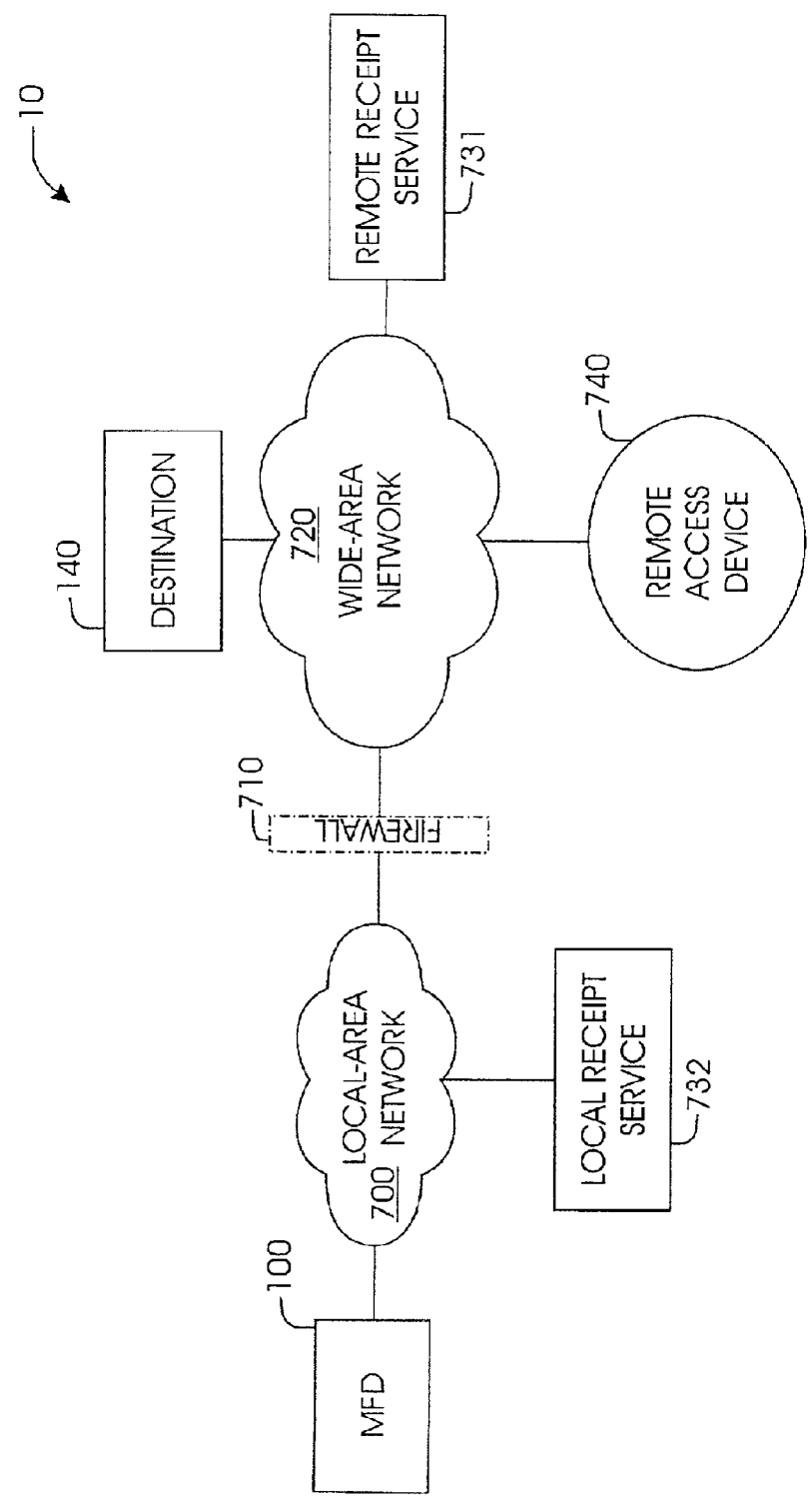
FIG. 5 is a high-level diagram illustrating another embodiment of a document tracking system.

Embodiments of document tracking method and system 10 therefor are illustrated in FIG. 1 and FIG. 5 according to the invention. Briefly, multifunction devices 100 may be used to scan paper documents 110 and then transmit the scanned image to one of a variety of destinations 140–144, including but not limited to an email account 140, a facsimile account 141, a printer or copier 142, a PC or an independent software vendor (ISV) application 143, or any number of other devices or communication services 144 (e.g., a mobile phone, PDA, Internet web page, etc.). After sending the document 110 to one or more of the network destinations 140–144, the user may desire an acknowledgment that the recipient(s) received it. Thus, the user may wait for the recipient(s) to respond to a request to acknowledge receipt of the document 110 (e.g., by reply email). Alternately, the user may telephone the recipient to ask whether it was received. As explained above, however, this is time consuming and inconvenient for both the user and the recipient(s).

According to the teachings of the invention, system 10 may be provided for document tracking. System 10 may comprise a multifunction device 100 for generating the electronic document 120 from a paper document 110 and sending it to a network destination (e.g., 140). Preferably, a tracking component 230 is generated for the electronic document 120 and sent from the multifunction device 100 to a receipt service 730. When the electronic document 120 is at the network destination 140, a confirmation of receipt (e.g., a Hypertext Markup Language (HTML) document, a JAVA servlet, cgi script, etc.) may be sent from the network destination 140 to the receipt service 730. The receipt service receives the tracking component and the confirmation of receipt and may generate a return receipt 300 (FIG. 3) based at least in part on the tracking component 230 and the confirmation 235 to acknowledge receipt of the electronic document 120 by the network destination 140.

The system 10 may be operated as follows for tracking a document 110. The document 110 may be converted to electronic format 120 at a multifunction device 100 and delivered to one or more network destinations 140–144. In addition, a tracking component 230 for the document may also sent from the multifunction device 100 to a receipt service 730. Preferably, when the document 120 arrives at the network destination 140, a confirmation 235 is generated and also delivered to the receipt service 730. Upon receiving the tracking component 230 and/or the confirmation 235, the receipt service 730 may generate a return receipt based at least in part on the tracking component 230 and on the confirmation 235 to acknowledge receipt of the document by the network destination.

Accordingly, the user does not have to wait for the recipient to send a separate message (e.g., email) that acknowledges receipt of the document. Nor does the user have to telephone or otherwise contact the recipient(s) and inquire as to whether the document was received. In addition, the invention is not necessarily limited to the software being used by the recipient, and may be used with a variety of different types of devices. Furthermore, the invention does not require that the sender route the document itself via a third-party Internet site to request a receipt from the recipient.

Having generally described document tracking methods and system therefor, as well as some of its more significant features and advantages, the various embodiments of the invention will now be described in further detail.

FIG. 1 is a high-level diagram illustrating an embodiment of system 10 for tracking receipt of a document 110 sent from a multifunction device 100 at one or more network destinations 140–144 (hereinafter, both collectively and individually referred to as 140). The multifunction device 100 may comprise an automatic document feeder (ADF) 101 and/or a scanning bed 103 for converting a paper document 110 to an electronic document 120. The electronic document 120 may be sent from the multifunction device 100 via a suitable network 130 (e.g., the Internet, an Intranet, a telephone network, a wide-area network (WAN), a combination thereof, etc.) to one or more destinations 140. According to the teachings of the invention, a tracking component 230 for the electronic document 120 is preferably generated by the multifunction device 100 and may be sent to the receipt service 730 (e.g., a network server, an Internet site, a PC having network access, etc.). For example, the tracking component 230 may comprise computer-readable data such as a tracking number, a time, instructions for posting a return receipt, etc. In any event, when the electronic document 120 is at the network destination 140, a confirmation 235 (e.g., the tracking number, time received, etc.) may be delivered to the receipt service 730, matched to the tracking component 230, and a return receipt 300 (FIG. 3) is preferably generated and posted (e.g., on an Internet site, returned to the multifunction device 100, etc.) to acknowledge receipt thereof at the network destination 140.

In one preferred embodiment, the multifunction device 100 is an HP DIGITAL SENDER™ 9100C (Hewlett Packard Company, Palo Alto, Calif.). The HP DIGITAL SENDER™ 9100C is enabled for sending documents to Internet email accounts, fax machines, to PCs (e.g., for viewing or editing with suitable software applications), to a network folder, and to HP JETSEND®-enabled devices. In another embodiment, the multifunction device 100 may comprise a multifunction peripheral (MFP), such as the HP OFFICE JET® G95 available from Hewlett-Packard Company. The HP OFFICE JET® G95 is enabled for printing, copying, faxing, and scanning documents. However, it is understood that any suitable multifunction device, now known or later developed, may be used according to the teachings of the embodiments of the invention. Indeed, it is understood that in other embodiments, the multifunction device 100 may be another multifunction device or multifunction peripheral, a network digital copier, an "all-in-one" device for attachment to a PC, a document management machine, a network-capable scanner, etc. Accordingly, the present invention should not be regarded as limited to use with the particular multifunction device 100 shown and described herein.

The multifunction device 100 is preferably enabled for connection to a Transmission Control Protocol/Internet Protocol (TCP/IP) network 130. However, the multifunction device 100 may be connected over any suitable network or networks, including but not limited to, a local area network (LAN), a wide area network (WAN), a telephone network, a secure network, an Intranet, the Internet, etc. Likewise, the multifunction device 100 may be connected to the network 130 in any suitable manner, including but not limited to hardwired connection, infrared connection, via satellite, dial-up connection (i.e., using a modem), dedicated connection (e.g., cable, digital subscriber line (DSL), T-1, T-3), etc.

Before continuing, the following definition is provided to further clarify the invention. The term "paper document" as used herein is intended to encompass any document (e.g., photocopies, printed paper, photographs, slides, viewgraphs, color documents, black/white documents, etc.) that may be imaged and included with electronic document 120 using the multifunction device 100. In addition, more than one paper document 110 may be converted to one or more electronic documents 120. For example, a stack of paper documents 110 may be scanned using the ADF 101, or the user may individually scan a plurality of paper documents 110 using the scanning bed 103. In any event, the scanned images may be combined or individually assembled as one or more electronic documents 120.

Figure 2:
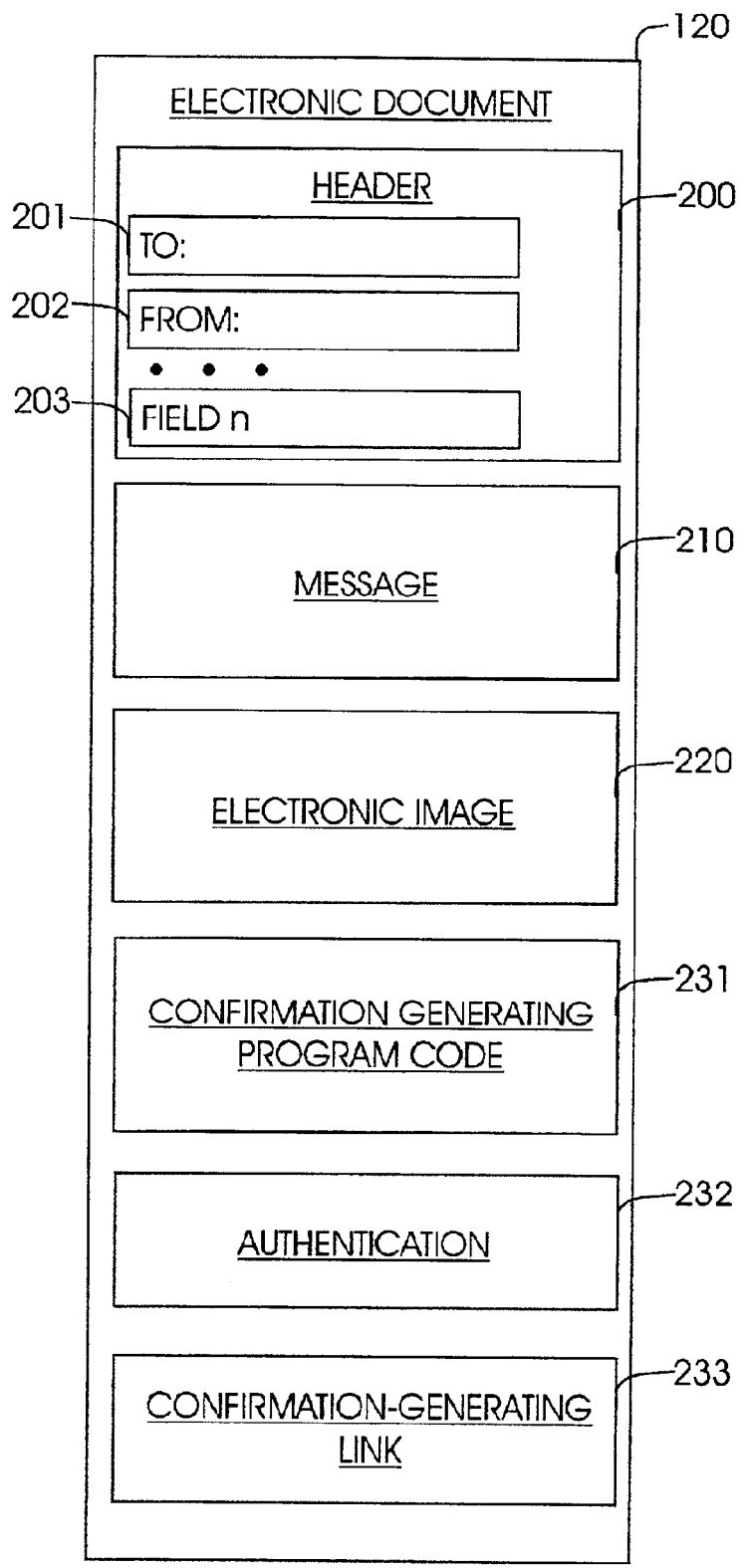
FIG. 2 shows an exemplary electronic document for use with the document tracking system.

An exemplary electronic document 120 is shown in more detail in FIG. 2. The electronic document 120 may comprise a header 200, a message 210, an electronic image 220 of the paper document 110, and confirmation generating program code 231, each of which are further explained below. However, it is understood that the electronic document 120 may comprise additional or fewer components than those shown in FIG. 2. In addition, components may be combined with one another. For example, the message 210 may be a field in the header 200. It is also understood that although the electronic document 120 preferably uses standard network protocols for email format and network delivery, the electronic document 120 may be formatted in any suitable manner.

Preferably, the various components of the electronic document 120 are assembled according to simplified mail transport protocol (SMTP) standards. In addition, the electronic document 120 is preferably assembled automatically and transparently to the user. That is, the user preferably only needs to specify a recipient and position the paper document 110 in the ADF 101 or directly on the flatbed scanner 103, and activate the multifunction device 100. The multifunctional peripheral 100, using suitable program code, then images the paper document 110 and includes it with the various components of the electronic document 120 with few, if any, additional steps required by the user.

The header 200 in the embodiment of the electronic document 120 shown in FIG. 2 preferably identifies routing information for the electronic document 120. For example, the header may identify a recipient 201, a user 202, etc. It is understood that the header 200 may comprise any suitable information (e.g., Field n (203)) in any suitable format. For example, the header 200 may comprise a fax number, an email address, an IP address, a universal resource locator (URL), meta data (e.g., the name of the user, a time stamp, formatting information, a platform type), a combination thereof, etc.

The message 210 in the embodiment of the electronic document 120 shown in FIG. 2 may be included for conveying additional information to the recipient. The message 210 may include instructional text or identifying information, much like that which may be included on a fax cover sheet. It is understood that the message 210 may take any suitable format. For example, the message 210 may comprise text or graphics. Likewise, the message 210 may be composed according to any suitable means. In one embodiment, the user may compose a personalized message using keys 107 (e.g., on-screen keys, an onboard keypad, an attached keyboard, etc.). In another embodiment, the user may select a predefined message from a menu shown in display 105. In yet another embodiment, the message 210 may be automatically generated. By way of example, the message 210 may be generated by suitable program code based on the user login ID, the attached document format, and/or any other suitable information (e.g., "Please find attached a document in ADOBE® PDF format from User A").

The electronic image 220 of the paper document 110 in the embodiment of the electronic document 120 shown in FIG. 2 is preferably a scanned image of the paper document 110. However, the attached document 220 may take any suitable format. Preferably, the electronic image 220 is formatted so that it may be viewed with readily available software (e.g., ADOBE® ACROBAT READER®, a web browser) or converted for output at a readily available device (e.g., another multifunction device, a fax machine, a printer, a photocopier). For example, the electronic image 220 may be formatted as a PDF, TIF, HTML, or XML file, as electronic signals for receipt by a fax machine or a mobile telephone, or in any other suitable format.

The electronic document 120 preferably also comprises confirmation generating program code 231. The confirmation generating program code 231 may comprise any suitable program code for generating the confirmation 230 when the electronic document 120 is at the network destination 140. For example, the confirmation generating program code 231 may comprise a JAVA applet, a cgi script, etc., that may be activated automatically when the electronic document 120 is at the network destination 140. Preferably, the confirmation generating program code 231 is included with the electronic document 120 (e.g., as an attachment), and sent therewith to the network destination 140. Alternatively, the recipient may manually "click" on a confirmation-generating link 233 (e.g., a uniform resource locator (URL)) included with the electronic document 120 (FIG. 2) for linking to a network site (e.g., an Internet site) for generating the confirmation 235. Once at the network destination 140, the confirmation generating program code 231 may generate a confirmation 235, and send the same to the receipt service 730 to acknowledge receipt of the document at the network destination 140.

According to preferred embodiments of the invention, the confirmation generating program code 231 comprises computer-readable program code for linking over the network 130 to the receipt service 730 and transmitting the confirmation 235 (e.g. computer readable data for the transaction). As such, when the electronic document 120 is received at the network destination 140, a transaction having suitable information for use in generating the return receipt 300 (e.g., having the transaction identity, receipt time, etc.) is sent from the network destination 140 to the receipt service 730. Program code at the receipt service 730 may then generate a return receipt 300 (e.g., an email message) based on this information and post it to notify the user that the electronic document 120 was received at the network destination 140.

It is understood that according to other embodiments of the invention, the confirmation generating program code 231 may comprise, for example, a self-contained JAVA script, HTTP commands, etc., for generating the return receipt 300 and posting the same directly from the network destination 140. According to other embodiments, authentication 232 (e.g., a digital signature and/or certificate) may also be included with the electronic document 120 (FIG. 2) so that the confirmation generating program code 231 is not treated as a virus when the electronic document 120 is received by the network destination 140.

Alternatively, the confirmation generating program code 231 may comprise instructional text (e.g., ASCII text in message 210) that requests the recipient to "click here". In turn, the recipient may be linked via a URL to the receipt service 730 to access the program code for generating and posting the receipt resides. As an illustration, when the recipient receives the electronic document 120 and reads the message 210, the recipient may "click" on the URL and be linked to an Internet site (i.e., the receipt service 730). As another illustration, when the recipient receives the electronic document 120 and reads the message 210, the recipient may "click" on the URL and a signal identifying the recipient and the electronic document 120 may be sent to the receipt service 730. As such, the return receipt 300 may be generated at the receipt service 730 and posted to acknowledge receipt of the document at the network site 140.

It is understood that the electronic document 120, and the various components thereof, shown and described with respect to FIG. 2 are merely illustrative of an exemplary electronic document 120, and are not intended to limit the scope of the invention thereto. Other embodiments are also contemplated as being within the scope of the invention. In another embodiment, the electronic document 120 may include fewer or additional components than those shown. For example, the message 210 may be omitted. In another embodiment, one or more components may be combined with other components. For example, the confirmation generating program code 231 may be combined with the message 210 or the electronic image 220, as illustrated above.

Figure 3:
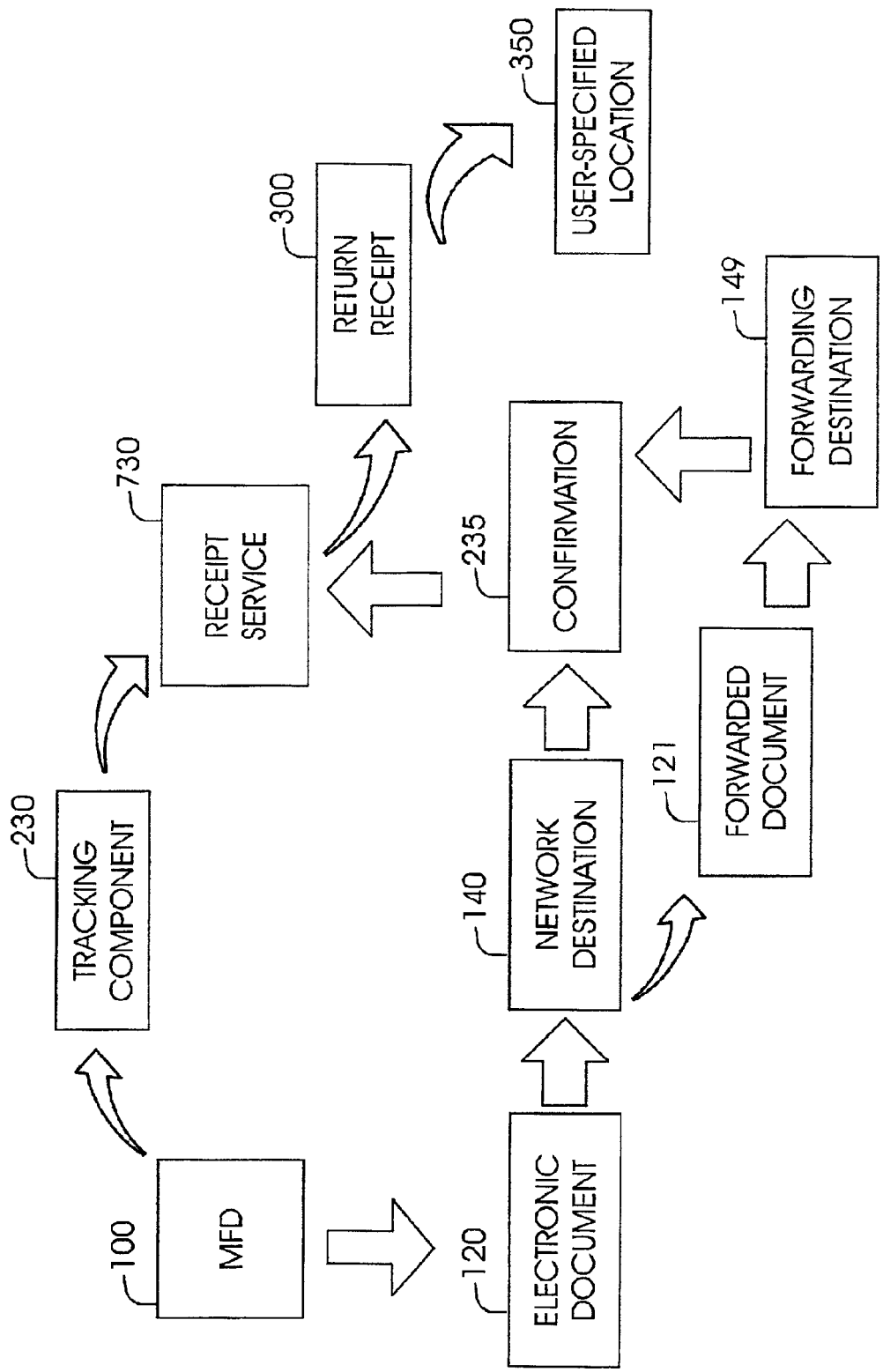
FIG. 3 is an illustration of an embodiment of document tracking methods.

An embodiment of document tracking methods is illustrated in FIG. 3. The paper document 110 may be converted and assembled into an electronic document 120, as described above. According to the embodiment shown in FIG. 3, the electronic document 120 is sent from the multifunction device 100 to the network destination 140 over network 130. In addition, the tracking component 230 for the document 120 is delivered to the receipt service 730. Once the electronic document 120 is at the network destination 140, the confirmation generating program code 231 is activated (manually or automatically, as discussed above) and a confirmation 235 is delivered to the receipt service 730. The receipt service 730 generates a return receipt 300 based at least in part on the tracking component 230 and the confirmation 235. In addition, the receipt service 730 also preferably posts the return receipt 300 to acknowledge receipt of the electronic document 120 at the network destination 140. The return receipt 300 may be posted by sending the same (e.g., an email message) to the sender at a user-specified location 350 (e.g., the multifunction device, a facsimile machine, an email account, a pager, etc.).

The confirmation generating program code 231 may be activated at any time when the electronic document 120 is at the network destination 140. Preferably, the confirmation generating program code 231 is activated immediately when the electronic document 120 arrives at the network destination 140, or within in a relatively short time thereafter. In other embodiments, however, the confirmation generating program code 231 may be activated at any time after the electronic document 120 has arrived at the network destination 140.

In addition, the confirmation generating program code 231 is preferably automatically activated at the network destination 140. In other embodiments, however, the confirmation generating program code 231 may be manually activated by the recipient or by an administrator after the electronic document 120 arrives at the network destination 140 (e.g., when the recipient views the message 210, "clicks" on the link to a URL, opens the electronic image 220, etc.). Other embodiments for activating the confirmation generating program code 231 are also contemplated and may vary based on design considerations, such as security issues, whether the electronic document is from an "in-house" employee or a recognized user, etc.

The return receipt 300 may be posted by sending it back to the multifunction device 100. However, other embodiments are also contemplated as being within the scope of the invention. In another embodiment the return receipt 300 may be sent to another device designated by the user. For example, the return receipt 300 may be sent to a pager or mobile phone. Or for example, the return receipt 300 may be sent to more than one device, such as the multifunction device 100 and a pager. In another embodiment, the return receipt 300 may be sent to a remote receipt service 731 (FIG. 5), as described in more detail below.

Preferably, the return receipt 300 comprises at least the time that the electronic document 120 is received at the network destination 140. However, it is understood that the return receipt 300 may comprise any suitable information. For example, the return receipt 300 may comprise the name of the recipient, the time that the electronic document 120 was received at the network destination 140, the time that the electronic document 120 was accessed by the recipient, etc. In addition, it is understood that the return receipt 300 may take any suitable format. For example, the return receipt 300 may be an email message, a fax, a pager alert, a voice message, a message shown in display 105 of the multifunction device 100, etc.

In another embodiment of document tracking methods, the paper document 110 may be converted and assembled into an electronic document 120, as described above, and sent to a plurality of network destinations (e.g., 140, 141, and 142). For example, the electronic document 120 may be sent from the multifunction device 100 to a first destination 140. Once the electronic document 120 is at the first destination 140, the confirmation generating program code 231 may be activated for generating a return receipt 300. The confirmation generating program code 231 preferably also posts the return receipt 300 to acknowledge receipt of the electronic document 120 at the first destination 140. When the document is sent on or forwarded (e.g., forwarded document 121) to another destination (e.g., forwarding destination 149), the confirmation generating program code 231 may again be activated at the forwarding destination 149 for generating another return receipt 300. The tracking component 230 preferably also posts the return receipt 300 to acknowledge receipt of the forwarded electronic document 121 at the next destination 141. The return receipt 300 may be posted by delivering the same to the multifunction device 100. In addition, the return receipt 301 may be posted by delivering the same to the forwarding device 140.

Preferably, the user may designate where the return receipt 300 is delivered. For example, the user may designate that the return receipt 300 from the first destination 140 is delivered to the user at the multifunction device 100 and that no further return receipts are delivered to the user. Also preferably, where the electronic document 120 is forwarded, the forwarding user may be provided with the option of specifying to whom the return receipt 300 is delivered. These and other embodiments are contemplated as being within the scope of the invention, and will vary based on design considerations, such as the position or job requirements of various employees, the desired privacy, security issues, etc.

It is understood that the document tracking methods of the invention may be used for a variety of other embodiments of workflow management. For example, the document tracking methods may be used for managing a single document that is sent to one recipient and then sent to another recipient by the first recipient and so forth, as just described. In this example, the sender may request a return receipt notifying the sender when a sensitive document is forwarded (e.g., for security purposes). Or for example, the document tracking methods may be used for managing a document that is sent to multiple recipients from one sender (e.g., as part of a distribution list). Likewise, the document tracking methods may also be used to manage more than one document.

Other embodiments of workflow management according to the teachings of the invention are also contemplated as being within the scope of the invention. For example, the electronic document 120 may be changed at one destination (e.g., 140) before it is forwarded to another destination (e.g., 141). In another embodiment, for example, the electronic document 120 may be forwarded from the second destination 141 to yet another destination. In yet another embodiment, for example, the electronic document 120 may be forwarded from one destination (e.g., 140), or even from the multifunction device 100, to a plurality of destinations (e.g., as part of a distribution list). In each of these embodiments, a receipt 300 may be generated and posted for each destination 140, or for selected destinations 140, to acknowledge that the electronic document 120 has been received thereby.

Figure 4:
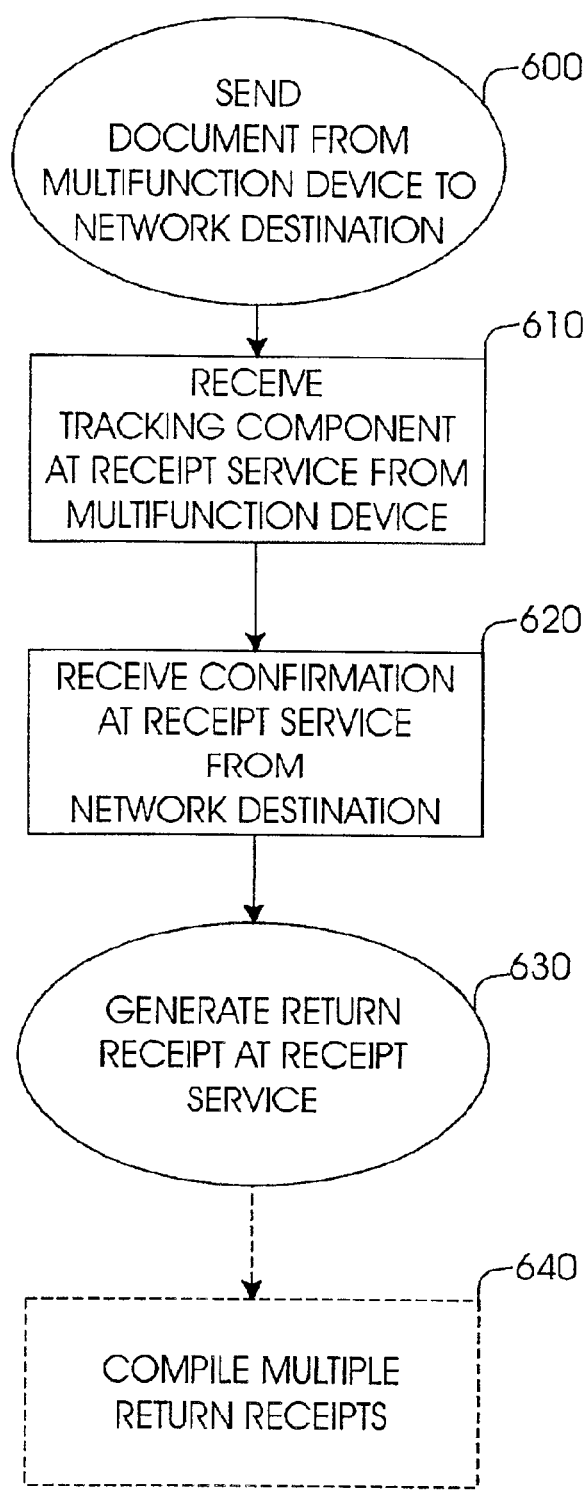
FIG. 4 is a flow chart illustrating an embodiment of document tracking methods.

The document tracking methods discussed above may be further understood with reference to the flow chart shown in FIG. 4 illustrating a preferred embodiment of the invention. In step 600, the electronic document 120 is preferably sent from the multifunction device 100 to one or more network destinations 140. For example, the paper document 110 may be converted to electronic format (i.e., assembled as electronic document 120 with various components thereof) at the multifunction device 100. In step 610, the tracking component 230 is preferably sent from the multifunction device 100 to the receipt service 730. In step 620, a confirmation is delivered from the network destination 140 to the receipt service indicating that the document was received. In step 630, the receipt service 730 may generate a return receipt 300 acknowledging receipt of the document at the network destination 140. Optionally, the receipt service 730 may be used to compile multiple receipts, as shown in step 640, and discussed in more detail with respect to embodiments of the invention for workflow management.

It is understood that the steps shown and described in FIG. 4 are merely illustrative of a preferred embodiment of document tracking methods. However, other embodiments of the method are also contemplated as being within the scope of the invention.

Another embodiment of document tracking system 10 is illustrated in FIG. 5, wherein the receipt service 730 may be a local receipt service 732 (e.g., on LAN 700) and/or a remote receipt service 731 (on WAN 720). As discussed above, the paper document 110 may be converted and assembled into an electronic document 120. The electronic document 120 may be sent from the multifunction device 100 over network 130 (i.e., LAN 700 and WAN 720, in FIG. 5) where it is routed to the network destination 140. Likewise, the tracking component 230 may be delivered to the receipt service 731, 732. Once the electronic document 120 is at the network destination 140, the confirmation generating program code 231 may generate a confirmation and send the same to the receipt service 731, 732. In turn, the receipt service 731, 732 may generate a return receipt 300 to acknowledge receipt of the electronic document 120 at the network destination 140.

According to this embodiment, the receipt service 731, 732 is preferably program code at another site on the network (e.g., LAN 700, WAN 720). For example, the remote receipt service 731 may be program code residing on a server at an Internet site, while the local receipt service 732 may be program code residing on a server on an Intranet. When the electronic document 120 is sent from the multifunction device 100, the transaction identity may be sent to the remote receipt service 731. Accordingly, when the electronic document 120 is received at the network destination 140, the transaction identity is preferably transmitted (e.g., as confirmation generating program code 231) to the remote receipt service 731 where it is matched to the transaction identity previously received from tracking component 230. The remote receipt service 731 may then generate a return receipt 300. According to this embodiment, the return receipt 300 may be posted as a table for display at an Internet web page, a pager alert sent to a pager, an audio message sent to the user's mobile phone, etc.

Preferably, the user may use the local receipt service 732 and/or the remote receipt service 731 to identify one or more devices and/or services for receiving the return receipt 300. Accordingly, the user may configure the local receipt service 732 and/or the remote receipt service 731 even after the electronic document 120 has been sent. For example, the user may configure the local receipt service 732 and/or the remote receipt service 731 to deliver the return receipt 300 to the multifunction device 100 during business hours, and reconfigure the local receipt service 732 and/or the remote receipt service 731 to deliver the return receipt 300 to the user's pager (not shown) when the user leaves the office. As such, any return receipts 300 received and processed by the local receipt service 732 and/or the remote receipt service 731 are delivered to the user at the multifunction device 100 when the user is at the office, and any return receipts 300 posted to the local receipt service 732 and/or the remote receipt service 731 after the user leaves the office, are delivered to the user's pager.

In one embodiment, the receipt service 730 may comprise an Internet web page (e.g., remote receipt service 732). According to such an embodiment, the user may access the Internet web page from any number of devices, and at the user's convenience, to confirm receipt of the document(s) sent from the multifunction device 100. Likewise, the multifunction device 100 may be linked via a secure network 700 (e.g., behind firewall 710), and the user may not have access to the secure network 700 (e.g., while traveling). Or for example, a third-party (e.g., the recipient, a "carbon copy" (cc:) recipient) may not have access to the secure network 700. According to this embodiment, anyone desiring acknowledgement of receipt of the document, and preferably having the necessary permissions (e.g., a user ID and password), may access the Internet web page and confirm receipt of the document(s) from elsewhere on the network 720 (e.g., from remote access device 740).

In another embodiment, the receipt service 730 may be used to manage a plurality of return receipts 300. For example, when the electronic document 120 is sent using a distribution list (i.e., to a plurality of recipients), the return receipts 300 from each recipient may be sent to the receipt service 730. The receipt service 730 may compile the return receipts 300 from each recipient and notify the user when all of the recipients have acknowledged receipt of the document. Alternately, the return receipts 300 from each recipient may be compiled as an Internet web page so that the user may periodically check the Internet web page (e.g., remote receipt service 731) regardless of whether a firewall 710 is in place, and determine which of the intended recipients received the document and which have not received it.

In another embodiment, the receipt service 730 may be used for workflow management. That is, the receipt service 730 may be used to track the progress of a sent document. As an illustration, an Employee may have drafted a project proposal that requires the review and approval of a Supervisor and a Committee Chairperson. The Employee may position a printed copy of the project proposal (e.g., document 110) in the ADF 101 (FIG. 1) or directly on the scanning bed 103 (FIG. 1) of the multifunction device 100, wherein it is converted to an electronic document 120 and sent to the Supervisor for review. The receipt service 730 may post a return receipt 300 acknowledging that the Supervisor received the document. The Supervisor may review the project proposal and forward it to the Committee Chairperson for approval. When the Committee Chairperson receives the document, another return receipt may be generated and posted to the receipt service 730. Accordingly, the Employee may access the receipt service 730 to determine where the document is at any given time and how long it has been there. When the document was not received, the Employee may resend it. Or when the document has not been forwarded to the Committee Chairperson, the Employee may contact the Supervisor to learn the status of the project proposal.

It is understood that other embodiments of the return receipt service 730 are also contemplated as being within the scope of the invention. For example, when a return receipt 300 is not posted within a predetermined time (i.e., indicating that the electronic document 120 has not been received at the network destination 140), the receipt service 730 may notify the user as such. Accordingly, the user may resend the electronic document 120 to the recipient or recipients who have not received the electronic document 120. Alternately, the user may contact the appropriate network administrator (s) to troubleshoot the network. Or for example, the receipt service 730 may be used to monitor documents sent from one or more multifunction devices 100, such as by an administrator for monitoring whether confidential documents are being received by the intended recipients. Yet other embodiments of the receipt service 730 are also contemplated as being within the scope of the invention.

What is claimed is:

1. A document tracking method, comprising:
    sending a document from a multifunction device to a network destination;
    sending a tracking component for said document from said multifunction device to a receipt service;
    sending a confirmation of receipt to said receipt service when said document is at said network destination; and
    generating a return receipt based at least in part on said tracking component and said confirmation of receipt at said receipt service when said document is at said network destination to acknowledge receipt of said document by said network destination and wherein the method is configured to deliver said document from said multifunction device to said network destination without relying on an operational status of said receipt service.

2. The method of claim 1, further comprising manually activating delivery of said confirmation of receipt of said document at said network destination.

3. The method of claim 2, wherein manually activating delivery of said confirmation of receipt of said document comprises accessing a network site through a uniform resource locator (URL).

4. The method of claim 1, further comprising transmitting authentication means with said document.

5. The method of claim 1, wherein at least the step of sending said tracking component is transparent to a user.

6. The method of claim 1, further comprising posting said return receipt.

7. The method of claim 6, wherein posting said return receipt comprises sending said return receipt to a user-specified location.

8. The method of claim 6, wherein posting said return receipt comprises sending said return receipt to an email account.

9. The method of claim 6, wherein posting said return receipt is for access from said receipt service.

10. The method of claim 1, further comprising posting a plurality of return receipts generated when said document is received at each of a plurality of network destinations to acknowledge receipt of said document by each of said plurality of network destinations for workflow management of said multifunction device.

11. The method of claim 10, further comprising compiling said plurality of return receipts.

12. The method of claim 1, further comprising posting a return receipt generated when said document is received at a forwarding destination for workflow management of said multifunction device.

13. The method of claim 1, wherein a sender of said document designates delivery of said return receipt.

14. A document tracking method, comprising:
    sending an electronic document from a multifunction device to a network destination;
    sending an electronic tracking component for said document from said multifunction device to a receipt service;
    sending a confirmation of receipt to said receipt service when said electronic document is at said network destination; and
    generating a return receipt at said receipt service based at least in part on said tracking component and said confirmation of receipt to acknowledge receipt of said electronic document by said network destination and wherein the method is configured to deliver said electronic document from said multifunction device to said network destination without relying on an operational status of said receipt service.

15. The method of claim 14, further comprising automatically sending said confirmation of receipt from said network destination to said receipt service when said electronic document is at said network destination.

16. The method of claim 14, further comprising manually activating delivery of said confirmation of receipt to said receipt service when said electronic document is at said network destination.

17. The method of claim 14, further comprising sending a tracking component for said electronic document from said multifunction device to said receipt service, wherein said receipt service matches said tracking component with said confirmation of receipt to generate said return receipt.

18. The method of claim 14, further comprising posting said return receipt based on a sender designation therefor.

19. The method of claim 14, further comprising providing remote access to said return receipt.

20. The method of claim 14, further comprising receiving a plurality of confirmation of receipts at said receipt service, said plurality of confirmation of receipts acknowledging receipt of said document by a plurality of network destinations.

21. The method of claim 14, further comprising posting a return receipt generated when said document is received at a forwarding destination.

22. A system for tracking a document, comprising:
    a multifunction device for sending said document to a network destination;

a tracking component generated for said document and sent from said multifunction device;

a confirmation of receipt sent from said network destination when said document is at said network destination; and a receipt service for receiving said tracking component and said confirmation of receipt and for generating a return receipt based at least in part on said tracking component and said confirmation of receipt to acknowledge receipt of said document by said network destination and wherein the method is configured to deliver said document from said multifunction device to said network destination without relying on an operational status of said receipt service.

23. The system of claim 22, wherein said tracking component comprises computer-readable data for identifying said document and said confirmation of receipt comprises computer-readable data for confirming receipt of said document at said network destination.

24. The system of claim 22, wherein said receipt service manages workflow of said multifunction device based at least in part on said return receipt.

25. The system of claim 22, wherein said return receipt is remotely accessible from said receipt service.

26. The system of claim 22, wherein said receipt service receives a plurality of return receipts to acknowledge receipt of said document by each of a plurality of network destinations.

* * * * *